United States Patent
Relan et al.

(10) Patent No.: US 7,372,839 B2
(45) Date of Patent: May 13, 2008

(54) GLOBAL POSITIONING SYSTEM (GPS) BASED SECURE ACCESS

(75) Inventors: Sandeep Relan, Bangalore (IN); Brajabandhu Mishra, Bangalore (IN); Rajendra Khare, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/807,686

(22) Filed: Mar. 24, 2004

(65) Prior Publication Data

US 2005/0213519 A1     Sep. 29, 2005

(51) Int. Cl.
*H04Q 7/24* (2006.01)
(52) U.S. Cl. .......... 370/338; 455/410
(58) Field of Classification Search .......... 455/41.1; 380/258; 713/200, 201, 202; 370/255, 277, 370/313, 316
See application file for complete search history.

(56) References Cited

U.S. PATENT DOCUMENTS

| | | | | | |
|---|---|---|---|---|---|
| 5,243,652 | A * | 9/1993 | Teare et al. | .................. | 380/250 |
| 5,757,916 | A * | 5/1998 | MacDoran et al. | ......... | 380/258 |
| 5,790,073 | A * | 8/1998 | Tayloe et al. | .......... | 342/357.16 |
| 5,903,225 | A * | 5/1999 | Schmitt et al. | ............. | 340/5.25 |
| 5,922,073 | A * | 7/1999 | Shimada | ...................... | 713/200 |
| 6,009,116 | A * | 12/1999 | Bednarek et al. | ............ | 375/130 |
| 6,104,815 | A * | 8/2000 | Alcorn et al. | ................ | 380/251 |
| 6,178,236 | B1 * | 1/2001 | Jreij et al. | ................... | 379/188 |
| 6,370,629 | B1 * | 4/2002 | Hastings et al. | ............ | 711/163 |
| 6,457,129 | B2 * | 9/2002 | O'Mahony | ...................... | 726/4 |
| 6,624,739 | B1 * | 9/2003 | Stobbe | ........................ | 340/5.2 |
| 6,657,535 | B1 * | 12/2003 | Magbie et al. | ............. | 340/5.31 |
| 6,720,860 | B1 * | 4/2004 | Narayanaswami | ......... | 340/5.54 |
| 6,811,488 | B2 * | 11/2004 | Paravia et al. | ................ | 463/42 |
| 6,919,790 | B2 * | 7/2005 | Kanazawa | .................. | 340/5.21 |
| 6,954,862 | B2 * | 10/2005 | Serpa | ........................ | 713/183 |
| 6,971,005 | B1 * | 11/2005 | Henry et al. | ................ | 713/155 |
| 7,043,754 | B2 * | 5/2006 | Arnouse | ...................... | 726/20 |
| 7,079,652 | B1 * | 7/2006 | Harris | ........................ | 380/258 |
| 7,080,402 | B2 * | 7/2006 | Bates et al. | .................... | 726/2 |
| 7,092,943 | B2 * | 8/2006 | Roese et al. | ................... | 707/9 |
| 2002/0002036 | A1 * | 1/2002 | Uehara et al. | ................ | 455/41 |
| 2002/0094777 | A1 * | 7/2002 | Cannon et al. | ............... | 455/41 |
| 2002/0129283 | A1 * | 9/2002 | Bates et al. | ................. | 713/202 |
| 2002/0137524 | A1 * | 9/2002 | Bade et al. | ................. | 455/456 |
| 2002/0161454 | A1 * | 10/2002 | Mukai et al. | .................. | 700/12 |
| 2003/0035544 | A1 * | 2/2003 | Herle et al. | ................. | 380/270 |
| 2003/0073448 | A1 * | 4/2003 | Ozeki et al. | ................. | 455/456 |
| 2003/0184474 | A1 * | 10/2003 | Bajikar | .................... | 455/414.2 |
| 2003/0217122 | A1 * | 11/2003 | Roese et al. | ................ | 709/219 |
| 2004/0002345 | A1 * | 1/2004 | Miki | ........................ | 455/456.1 |
| 2004/0111369 | A1 * | 6/2004 | Lane et al. | ................... | 705/40 |
| 2004/0140898 | A1 * | 7/2004 | Reeves | ..................... | 340/573.1 |
| 2004/0267551 | A1 * | 12/2004 | Yadav | ............................ | 705/1 |
| 2005/0151623 | A1 * | 7/2005 | von Hoffmann | ............ | 713/200 |

* cited by examiner

*Primary Examiner*—Ajit Patel
*Assistant Examiner*—Anh-Vu Ly
(74) *Attorney, Agent, or Firm*—McAndrews Held & Malloy, Ltd.

(57) ABSTRACT

Presented herein are systems and methods for global positioning system based secure access. A request for access to a computer network is received. A determination is made whether a mobile terminal is within a predetermined location. If the mobile terminal is within the predetermined location, access is granted. If the mobile terminal is outside of the predetermined location, access to the computer network is denied.

8 Claims, 4 Drawing Sheets

GLOBAL POSITIONING SYSTEM (GPS) BASED SECURE ACCESS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Passwords are a commonly practiced security measure that prevents unauthorized users from accessing computer systems as well as identifying authorized users during an access. However, unauthorized users have used a variety of measures to ascertain the passwords of authorized users.

Once an unauthorized user has obtained an authorized user's password, the unauthorized user can access the computer system in the same manner as the authorized user. Often times, the unauthorized user accesses the computer system for malicious purposes. The activity of the unauthorized user is generally not detected until significant damage or disruptions have occurred.

Requiring authorized users to change their passwords at regular intervals can curtail, at least to some extent, the activities of unauthorized users. However, the regular interval time period is usually several weeks or months. During this time period, an unauthorized user can cause significant damage and disruption. Even if the user changes password daily, it could still not be effective to inhibit unauthorized user to do significant damage and disruption for that duration.

As a result, some computer systems use a time varying randomly generated password for each authorized user. The administrator of the computer system provides each authorized user with a device. The device includes a pseudo-random number generator that generates a code at relatively short time intervals, such as every minute. The computer system is also equipped to determine the pseudo-random number at a given time. When the authorized user seeks to access the computer system, the authorized user uses the code generated and displayed by the device as the password.

The foregoing provides for quickly changing passwords that are valid for short times. Accordingly, even if an unauthorized user does obtain a password, the password is valid for a very short time period. This significantly curtails the damage that an unauthorized user can do.

Nevertheless, such computer networks can still be exposed to unauthorized users. As an additional security precaution, some computer systems also require access by authorized users from a particular client terminal. The particular client terminal is known as a secure terminal and is preferably located in a physically secured location. Accordingly, in order to gain unauthorized access to such a computer network, an unauthorized user would also have to physically breach the physical security at the secured location.

An unauthorized user can bypass the physical security at the secured location by gaining remote access to the secure terminal. Accordingly, remote access is usually cut off from the secure terminal. However, cutting off remote access to the terminal generally cuts of all communication between the secure terminal and the outside world, except between the secure terminal and the server for the computer network. This essentially reduces the secure terminal to a dedicated terminal for accessing the computer network.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are systems and methods for global positioning system based secure access.

In one embodiment, there is presented a method for granting access to a computer network. The method comprises receiving a request for access to the computer network; determining whether a mobile terminal is within a predetermined location; granting access to the computer network, if the mobile terminal is within the predetermined location; and denying access to the computer network, if the mobile terminal is outside of the predetermined location.

In another embodiment, there is presented an article of manufacture. The article of manufacture comprises a computer readable medium. The computer readable medium stores a plurality of executable instructions. The plurality of executable instructions are for receiving a request for access to the computer network; determining whether a mobile terminal is within a predetermined location; and granting access to the computer network, if the computer terminal is within the predetermined location; denying access to the computer network, if the computer terminal is outside of the predetermined location.

In another embodiment, there is presented a communication network for granting access to a computer network. The communication network comprises a server, and a wireless network. The server receives a request for access to the computer network. The wireless server determines the location of the mobile terminal through the communication medium using 'Global Positioning System (GPS) technique. The server granting access to the computer network is dependent on the location of the mobile terminal.

These and other advantages and novel features of the present invention, as well as details of an illustrated embodiment thereof, will be more fully understood from the following description and drawings.

DETAILED DESCRIPTION OF THE INVENTION

Figure 1:
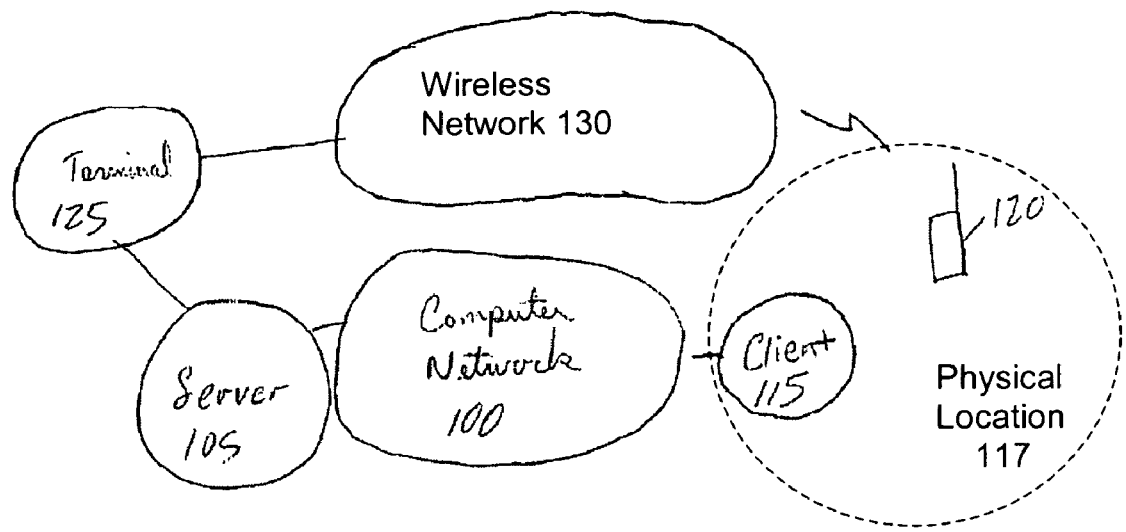
FIG. 1 is a block diagram of a communication system for providing secure access to a computer network in accordance with an embodiment of the present invention.

Referring now to FIG. 1, there is illustrated a block diagram of an exemplary communication system for configuring a mobile terminal to provide a time varying random password in accordance with an embodiment of the present invention. The system includes a computer network 100 and a wireless network 130.

The computer network 100 includes a server 105 that is accessible over a computer network 100 by a client terminal 115 in a physical location 117. The computer network 100 is any electronic or optical information distribution network and can comprise any combination of a variety of communication media, such as, but not limited to, the internet, the public switched telephone network, a local area network (LAN), and a wide area network (WAN).

The server 105 may provide access to a database storing sensitive information or the like, or allow individuals to perform various transactions. Accordingly, it is important to control access to the server 105. As a result, the server 105 requires a password from the client terminal 115 that validates the identity of the user at the client terminal 115.

As an additional layer of security, the computer network 100 requires the authorized user to access the computer network 100 from the physical location 117. The particular physical location 117 is preferably a physically secured location that is not accessible by the general public. When an authorized user attempts to access the computer network 100, the computer network 100 requests the user to provide a password. Additionally, the computer network 100 uses the wireless network 130, via terminal 125 to locate the position of a mobile terminal 120 associated with the user. The terminal 125 is a terminal that has access to the wireless network 130, either directly, or via another network. For example, the terminal 125 can comprises a computer connected to either the wireless network 130 or the public switched telephone network.

The computer network 100 grants access to the user, if the user provides the proper password, and the mobile terminal 120 is located in the physical location 117.

It is noted now that an unauthorized user needs, not only an authorized user's password, but also the ability to place the authorized user's mobile terminal 120 at the physical location 117 to access the computer network 100. Furthermore, even if an unauthorized user succeeds in remotely accessing the client terminal 115, the computer network 100 will not grant the unauthorized user access to the computer network 100. Accordingly, remote access need not be cut off from the client terminal 115. This allows the client terminal 115 to be used for other purposes, such as accessing the internet.

In one embodiment, as an additional security feature, the computer network 100 can use time varying randomly generated passwords. The time varying randomly generated passwords can be displayed on the mobile terminal 120. Exemplary systems and methods for the foregoing are described in "INTEGRATION OF SECURE IDENTIFICATION CARDS INTO CELL PHONE", U.S. application for patent Ser. No. 10/801,470, by Relan, et al., filed Mar. 16, 2004, which is incorporated herein by reference. During access, the authorized user provides the time varying randomly generated password displayed on the mobile terminal 120. This additional feature virtually assures that the accessing user himself is at the physical location 117. The mobile terminal 120 can also be integrated into the client terminal 115 for ease of use.

Figure 2:
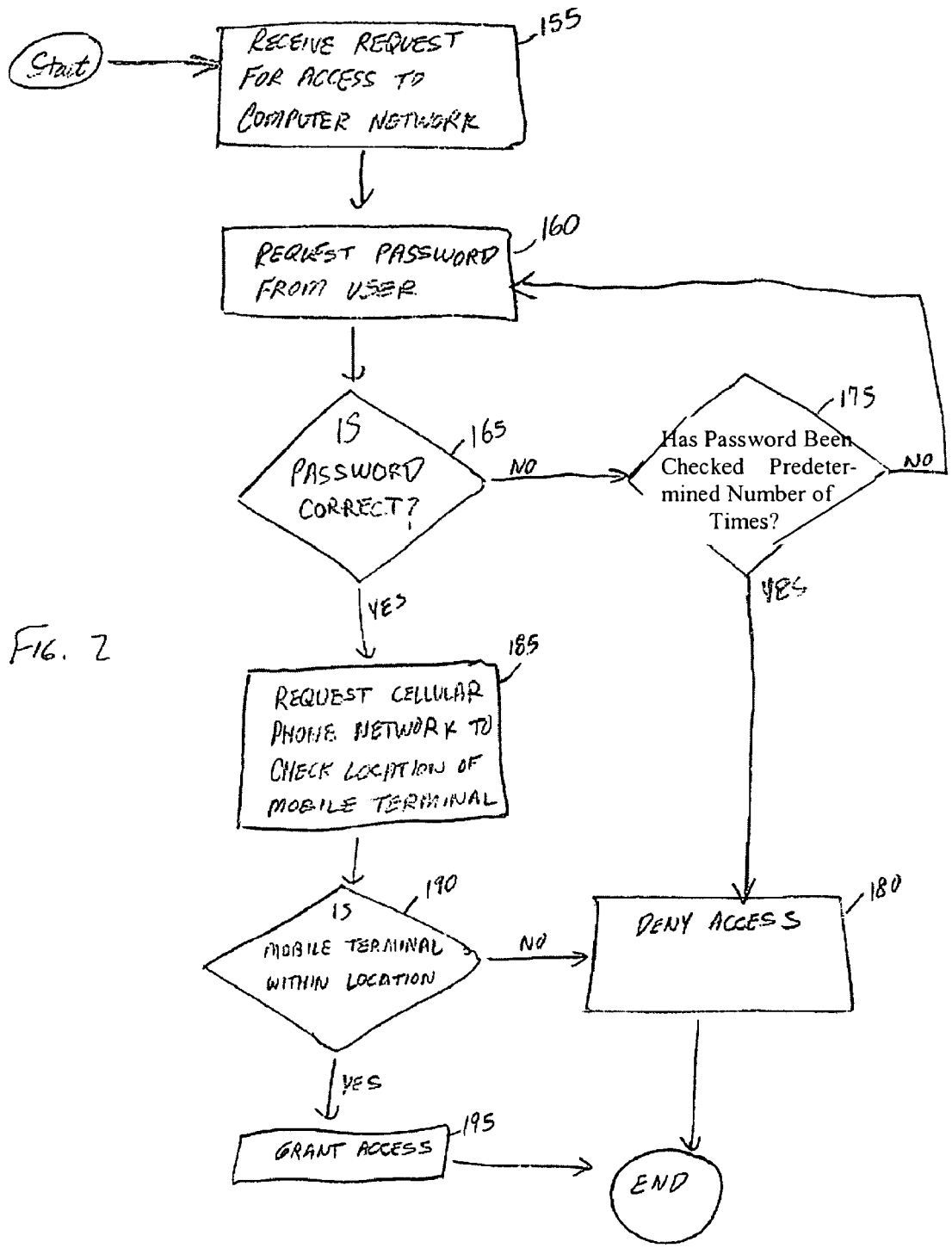
FIG. 2 is a flow diagram describing the operation of the server in accordance with an embodiment of the present invention.

Referring now to FIG. 2, there is illustrated a block diagram describing the operation of the server 105 in accordance with an embodiment of the present invention. At 155, the server 105 receives a request for access to the computer network 100. At 160, the server 105 requests the password from the user. As noted above, a number of schemes can be used for allocating the password. In one embodiment, the password can be a time varying randomly generated alpha-numeric number.

At 165, the server 105 determines whether the password provided is the correct password. If at 165, the password provided during 160 is incorrect, the server 105 requests the password again from the user a predetermined number of times. If after the predetermined number of times (175) the user has failed to provide the correct password, the server 105 denies access (180).

When the user provides the correct password at 165, the server 105 then requests, via terminal 125, a wireless network to check (185) the location of the mobile terminal 120 to determine (190) if the mobile terminal 120 is located within location 117. If the mobile terminal 120 is within location 117, the server 105 grants access (195) to the authorized user. If the mobile terminal 120 is not within the location 117, the server 105 denies (180) access.

The server 105 checks the location of the mobile terminal 120 using a wireless network 130. The wireless network 130 can comprise a variety of communication networks, such as, but not limited to, the Global System for Mobile (GSM) Communications, or the Personal Communication Services (PCS) network, IEEE 802.11 Wireless LAN network, Ethernet etc.

Figure 3:
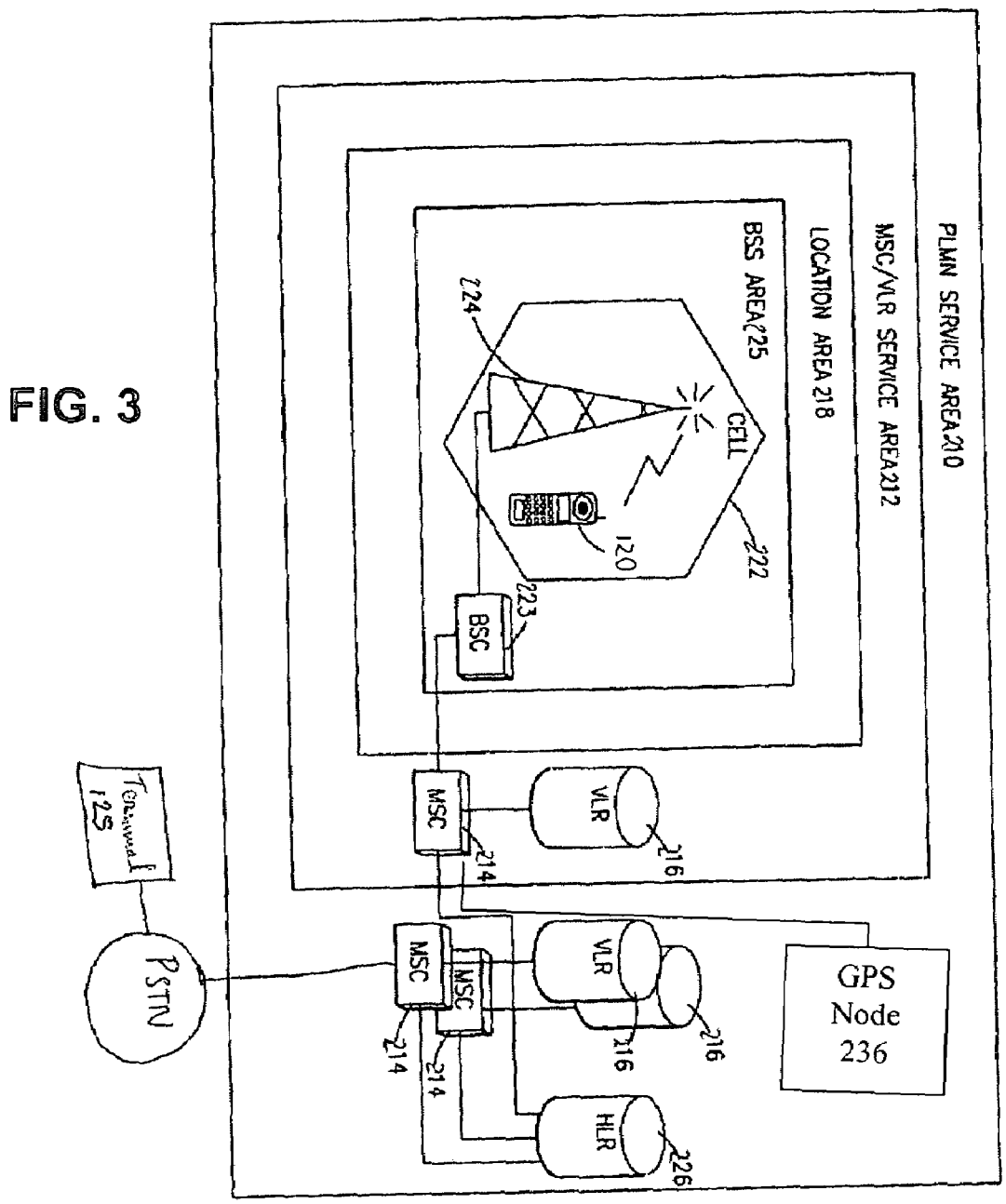
FIG. 3 is a block diagram of an exemplary Global System for Mobile Communication Public Land Mobile Network that can be used in accordance with an embodiment of the present invention.

Referring now to FIG. 3 there is illustrated a block diagram of a Global System for Mobile Communication (GSM) Public Land Mobile Network (PLMN) 210. The PMLN 210 is composed of a plurality of areas 212, each with a node known as a Mobile Switching Center (MSC) 214 and an integrated Visitor Location Register (VLR) 216 therein. The MSC/VLR areas 212, in turn, include a plurality of Location Areas (LA) 218, which are defined as that part of a given MSC/VLR area 212 in which a mobile terminal 120 may move freely without having to send update location information to the MSC/VLR area 212 that controls the LA 218. Each Location Area 212 is divided into a number of cells 222. The mobile terminal 220 is the physical equipment, e.g., a car phone or other portable phone, used by mobile subscribers to communicate with the cellular network 210, each other, and users outside the subscribed network, both wireline and wireless.

The MSC 214 is in communication with at least one Base Station Controller (BSC) 223, which, in turn, is in contact with at least one Base Transceiver Station (BTS) 224. The BTS is a node comprising the physical equipment, illustrated for simplicity as a radio tower, that provides radio coverage to the geographical part of the cell 222 for which it is responsible. It should be understood that the BSC 223 may be connected to several base transceiver stations 224, and may be implemented as a stand-alone node or integrated with the MSC 214. In either event, in one embodiment, the BSC 223 and BTS 224 components, as a whole, are generally referred to as a Base Station System (BSS) 225. At least one of the MSCs 214 are connected to the public switched telephone network (PSTN).

The PLMN Service Area or wireless network 210 includes a Home Location Register (HLR) 226, which is a database maintaining all subscriber information, e.g., user profiles, current location information, International Mobile Subscriber Identity (IMSI) numbers, and other administrative information. The HLR 226 may be co-located with a given MSC 214, integrated with the MSC 214, or alternatively can service multiple MSCs 214, the latter of which is illustrated in FIG. 3.

The VLR 216 is a database containing information about all of the mobile terminals 120 currently located within the MSC/VLR area 212. If a mobile terminal 120 roams into a new MSC/VLR area 212, the VLR 216 connected to that MSC 214 will request data about that mobile terminal 120 from the HLR database 226 (simultaneously informing the HLR 226 about the current location of the mobile terminal 120). Accordingly, if the user of the mobile terminal 120 then wants to make a call, the local VLR 216 will have the requisite identification information without having to re-interrogate the HLR 226. In the afore-described manner, the VLR and HLR databases 216 and 226, respectively, contain various subscriber information associated with a given mobile terminal 120.

The GSM PLMN 210 also includes the capabilities of locating a mobile terminal 120, using what is known as a Global Positioning System (GPS). The GPS uses a number of BTSs 224 in the vicinity of the mobile terminal 120 to determine the physical location of the mobile terminal 120. Each of the number of BTSs 224 use radio signals to determine the distance of the mobile terminal 120 from each BTS 224. The BTSs 224 transmit signals to the mobile terminal 120. Responsive to receiving the signal from the BTSs 224, the mobile terminal 120 transmits radio signals. The radio signals transmitted by the mobile terminal 120 are indicative of the time that the mobile terminal 120 transmits the signals. Accordingly, the distance between the mobile terminal 120 and the BTSs 224 can be determined from the time delay between the transmission of the signals and the receipt of the signals at the BTSs 224. A GPS node 236 determines and triangulates the distances from several BTSs 224 to determine the physical location of the mobile terminal 120.

In one embodiment of the present invention, during an attempted access by a user, the computer network 100 requests the GSM PLMN 210 to use the GPS to locate the mobile terminal 120. Responsive thereto, the GSM PLMN 210 reports the location of the mobile terminal 120 to the computer network 100. The computer network 100 then determines whether the mobile terminal 120 is within the physical location 117. If the mobile terminal 120 is within the physical location 117 and the user provides the correct password, the computer network 100 grants access.

Figure 4:
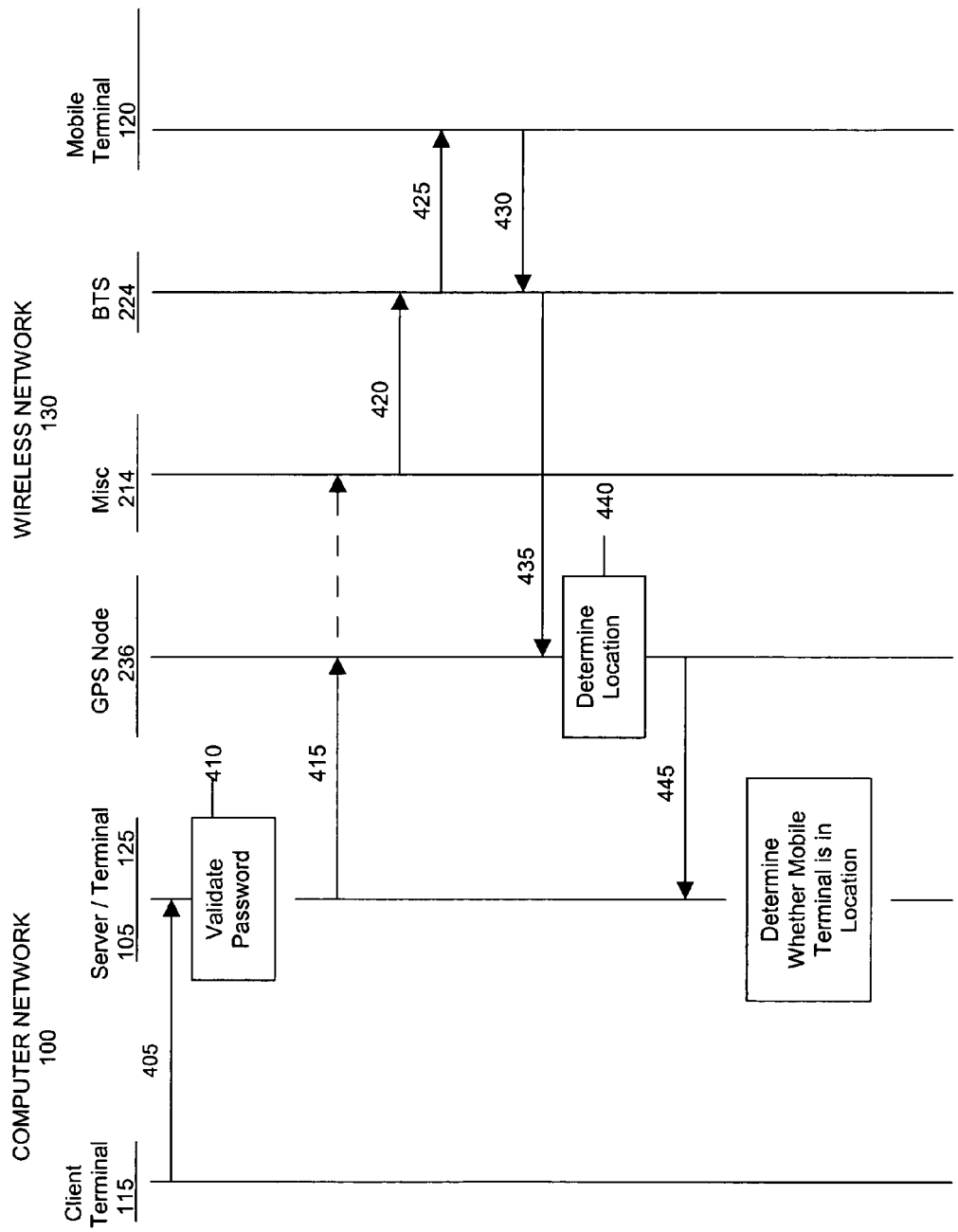
FIG. 4 is a signal flow diagram describing the operation of a communication network in accordance with an embodiment of the present invention.

Referring now to FIG. 4, there is illustrated a signal flow diagram describing the operation of the communication system in accordance with an embodiment of the present invention. A user requests access to the computer network 100 by providing a password (signal 405) to the server 105 of the computer network 100. The server 105 then validates the password (410). Upon validating the password, the server 105 then sends a request (signal 415) for the position of the mobile terminal 120 associated with the authorized user, to a GPS node 236 associated with the wireless network 130.

The infrastructure of the wireless network 130 routes the request to an MSC 214 associated with the mobile terminal 120. The MSC 214 commands (signal 420) several BTSs 224 to determine the distance between the said BTS and the mobile terminal 120. The BTSs 224 transmit radio signals (signal 425) to the mobile terminal 120 and receive radio signals (signal 430) from the mobile terminal 120.

The radio signals transmitted by the mobile terminal 120 are indicative of the time that the mobile terminal 120 transmits the signals. Accordingly, the distance between the mobile terminal 120 and the BTSs 224 can be determined from the time delay between the transmission of the signals and the receipt of the signals at the BTSs 224.

The BTSs 224 provide the time of receipt of the signals from the mobile terminal 120 to a GPS node 236 (signal 435). The GPS node 236 determines and triangulates (440) the distances from several BTSs 224 to determine the physical location of the mobile terminal 120. The GPS node 236 then provides the physical location (signal 445) of the mobile terminal 120 to the server 105, via terminal 125.

The server 105 then determines (450) whether the mobile terminal 120 is within the physical location 117 and denies or grants access, thereon.

Figure 5:
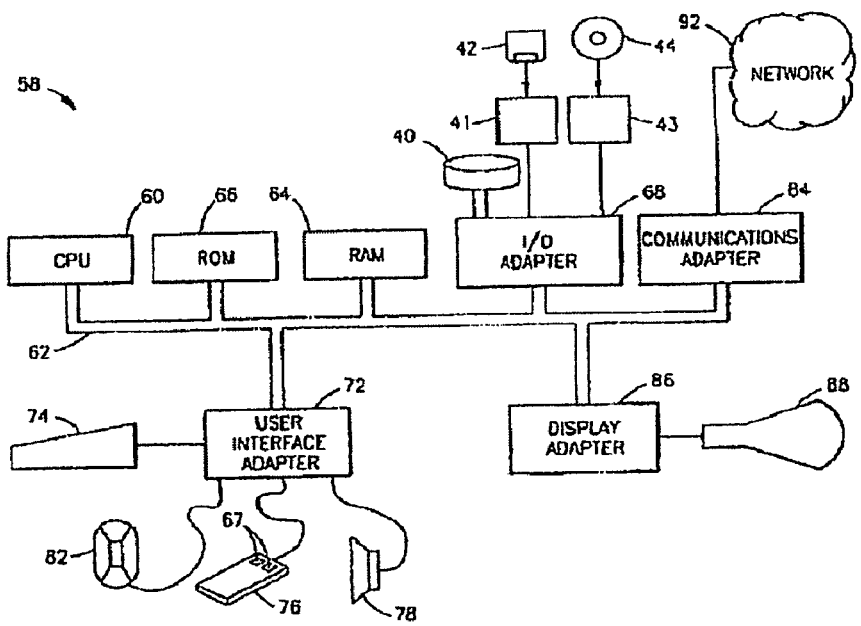
FIG. 5 is a block diagram describing an exemplary hardware environment where an embodiment of the present invention can be practiced.

Referring now to FIG. 5, there is illustrated a block diagram of an exemplary server 105 in accordance with an embodiment of the present invention. A CPU 60 is interconnected via system bus 62 to random access memory (RAM) 64, read only memory (ROM) 66, an input/output (I/O) adapter 68, a user interface adapter 72, a communications adapter 84, and a display adapter 86. The input/output (I/O) adapter 68 connects peripheral devices such as hard disc drives 40, floppy disc drives 41 for reading removable floppy discs 42, and optical disc drives 43 for reading removable optical disc 44 (such as a compact disc or a digital versatile disc) to the bus 62. The user interface adapter 72 connects devices such as a keyboard 74, a mouse 76 having a plurality of buttons 67, a speaker 78, a microphone 82, and/or other user interface devices such as a touch screen device (not shown) to the bus 62. The communications adapter 84 connects the computer system to a data processing network 92. The display adapter 86 connects a monitor 88 to the bus 62.

An embodiment of the present invention can be implemented as a file resident in the random access memory 64 of one or more computer systems 58 configured generally as described in FIG. 5. Until required by the computer system 58, the file may be stored in another computer readable memory, for example in a hard disc drive 40, or in removable memory such as an optical disc 44 for eventual use in an optical disc drive 43, or a floppy disc 42 for eventual use in a floppy disc drive 41. The file can contain a plurality of instructions executable by the computer system, causing the computer system to perform various tasks, such effectuating the flow chart described in FIG. 2.

It is noted that the physical storage of the sets of instructions physically changes the medium upon which it is stored electrically, magnetically, or chemically so that the medium carries computer readable information.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for granting access to a computer network, said method comprising:
   receiving a request for access to the computer network from a client terminal;
   determining whether a mobile terminal providing a time varying password is within a predetermined location, said mobile terminal being separate from the client terminal;
   requesting a wireless network to determine the location of the mobile terminal providing the time varying password using a global positioning system;
   granting access to the computer network, if the mobile terminal is within the predetermined location, and if the time varying password provided by the mobile terminal is received within a particular time interval from the client terminal; and
   otherwise denying access to the computer network.

2. The method of claim 1, wherein determining the location of the mobile terminal providing the time varying password further comprises:
   determining the location of the mobile terminal based on the received password, wherein the time varying password is indicative of the location of the mobile terminal.

3. The method of claim 1, wherein the client terminal receives the time varying password from a keyboard.

4. The method of claim 3, wherein the mobile terminal comprises a cellular telephone.

5. An article of manufacture comprising a computer readable medium, said computer readable medium encoded with a plurality of executable instructions to be executed by a computer for performing:
   receiving a request for access to a computer network from a client terminal;
   determining, at least in part, whether a mobile terminal that provides a time varying password is within a predetermined location, said mobile terminal being separate from the client terminal;
   requesting a wireless network to determine the location of the mobile terminal providing the time varying password using a global positioning system;
   granting access to the computer network, if the mobile terminal is within the predetermined location, and if the time varying password is received from the client terminal within a predetermined time interval; and
   otherwise denying access to the computer network.

6. The article of manufacture of claim 5, wherein determining the location of the mobile terminal further comprises:
   determining the location of the mobile terminal based on the received time varying password, wherein the time varying password is indicative of the location of the mobile terminal.

7. The article of manufacture of claim 5, wherein the client terminal receives the time varying password from a keyboard.

8. The article of manufacture of claim 7, wherein the mobile terminal comprises a cellular telephone.

* * * * *